United States Patent
Zhou et al.

(10) Patent No.: US 7,944,946 B2
(45) Date of Patent: May 17, 2011

(54) VIRTUAL MEMORY PROTOCOL SEGMENTATION OFFLOADING

(75) Inventors: Xu Zhou, Milpitas, CA (US); David Chen, San Jose, CA (US); Lin Huang, Fremont, CA (US); Guansong Zhang, Mountain View, CA (US)

(73) Assignee: Fortinet, Inc., Sunnyvale, CA (US)

( * ) Notice: Subject to any disclaimer, the term of this patent is extended or adjusted under 35 U.S.C. 154(b) by 357 days.

(21) Appl. No.: 12/254,931

(22) Filed: Oct. 21, 2008

(65) Prior Publication Data
US 2009/0304029 A1    Dec. 10, 2009

Related U.S. Application Data

(60) Provisional application No. 61/060,114, filed on Jun. 9, 2008.

(51) Int. Cl.
*H04L 12/56* (2006.01)
(52) U.S. Cl. ....................................................... 370/474
(58) Field of Classification Search .................. 370/471, 370/474, 476
See application file for complete search history.

(56) References Cited

U.S. PATENT DOCUMENTS

| | | | |
|---|---|---|---|
| 6,650,640 | B1 | 11/2003 | Muller et al. |
| 7,149,189 | B2 | 12/2006 | Huntington et al. |
| 7,512,684 | B2 | 3/2009 | Ronciak et al. |
| 2004/0042483 | A1 | 3/2004 | Elzur et al. |
| 2007/0061492 | A1 | 3/2007 | van Riel |
| 2009/0307363 | A1 | 12/2009 | Zhou |

OTHER PUBLICATIONS

Non-Final Rejection for U.S. Appl. No. 12/255,916 mailed May 14, 2010.

*Primary Examiner* — Melvin Marcelo
(74) *Attorney, Agent, or Firm* — Hamilton, DeSanctis & Cha LLP

(57) ABSTRACT

Methods and systems for a more efficient transmission of network traffic are provided. According to one embodiment, a method is provided for performing segmentation offloading, such as TCP segmentation offloading (TSO). An interface performs direct virtual memory addressing of a user memory space of a system memory on behalf of a network processor to fetch payload data originated by a user process running on a host processor. Then, the network processor segments the payload data across one or more packets.

11 Claims, 5 Drawing Sheets

VIRTUAL MEMORY PROTOCOL SEGMENTATION OFFLOADING

CROSS-REFERENCE TO RELATED APPLICATIONS

This application claims the benefit of U.S. Provisional Application No. 61/060,114 filed on Jun. 9, 2008, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2008, Fortinet, Inc.

BACKGROUND

1. Field

Embodiments of the present invention generally relate to network traffic acceleration. In particular, embodiments of the present invention relate to protocol segmentation offloading, such as Transmission Control Protocol (TCP) segmentation offloading (TSO).

2. Description of the Related Art

FIG. 1 conceptually illustrates TSO processing as it is typically performed. Large chunks of outbound network traffic, such as payload data 157, are typically broken down into smaller segments, such as packets 170. This process is typically performed by the TCP protocol in the host computer and is referred to as segmentation. When segmentation is performed on behalf of the host computer by separate hardware or a separate processor, such as one associated with a network interface controller (NIC), it is referred to as TCP packet Segmentation Offloading (TSO).

Conventional operating systems usually segregate virtual memory into kernel space 140 and user space 150. User mode applications, such as user process 120, are forbidden from writing to or otherwise accessing kernel space 140. User space 150 is the memory area in which user mode applications are permitted to operate.

Typically, TCP payload, such as payload data 157 is originated from a user process, such as user process 120. A kernel process 110 may create header data 145 and store the header data 145 in kernel space 140 of a system memory 130. TSO is used to increase system throughput and decrease central processing unit (CPU) usage; however, in traditional TSO implementations, in order to allow it to be physically addressed by a TCP segmentation unit 160, the payload data 157, which is stored in user space 150, needs to be copied from user space 150 to contiguous kernel space 140 by the CPU (not shown) to create a payload data copy 147. This movement of payload data from user space 150 to kernel space 140 within system memory 130 is CPU intensive and reduces outbound TCP traffic throughput.

Thus, there is a need in the art for improved outbound network traffic processing.

SUMMARY

Methods and systems are described for a more efficient transmission of network traffic. According to one embodiment, a method is provided for performing segmentation offloading. An interface performs direct virtual memory addressing of a user memory space of a system memory on behalf of a network processor to fetch payload data originated by a user process running on a host processor. Then, the network processor segments the payload data across one or more packets.

In the aforementioned embodiment, segmenting the payload data across one or more packets may involve creating one or more Transmission Control Protocol (TCP) packets by performing TCP segmentation.

In various instances of the aforementioned embodiments, the method further involves storing a buffer descriptor in system memory. The buffer descriptor contains (i) information indicative of a starting address of a packet buffer in system memory containing at least a portion of the payload data and (ii) information indicative of whether the starting address is virtual or physical.

In the context of various of the aforementioned embodiments, the method may further involve storing multiple buffer descriptors in system memory. For example, a first buffer descriptor may contain (i) information indicative of a first starting address of a first packet buffer in system memory containing a first portion of the payload data and (ii) information indicative of whether the first starting address is virtual or physical; and a second buffer descriptor may contain (i) information indicative of a second starting address of a second packet buffer in system memory containing a second portion of the payload data and (ii) information indicative of whether the second starting address is virtual or physical.

In some instances, the buffer descriptor may also contain information indicative of a virtual memory base address of a page directory. In such instances, performing direct virtual memory addressing of the user memory space may further involve using a directory entry of the page directory identified by the starting address to translate the starting address to a physical address within the user memory associated with the packet buffer.

Other embodiments of the present invention provide a method of performing Transmission Control Protocol (TCP) segmentation offloading. A host interface coupled to a system memory via an interconnect bus receives information indicative of a virtual memory address of TCP payload data in user memory space responsive to a user process running on a host processor storing to user memory space of the system memory the TCP payload data. The TCP payload data is fetched by the host interface from the user memory space on behalf of a network processor by performing direct virtual memory addressing of the system memory on behalf of the network processor based on the virtual memory address and a page table stored in the system memory. Then, the TCP payload data is segmented across one or more TCP packets by the network processor.

Other embodiments of the present invention provide a network device including a processor, a system memory, a network interface, an interconnect bus coupled to the processor and the system memory and an interface coupled to the network interface and the interconnect bus. The processor is configured to execute one or more kernel processes and one or more user processes. The system memory has stored therein a page table data structure containing information for use in connection with translating virtual addresses to physical addresses. A first portion of the system memory is designated for use by the one or more kernel processes and a second portion of the system memory is designated for use by the one or more user processes. The network interface is operable to segment payload data across one or more network packets and to transmit the one or more network packets to a destination via a network. The interface is adapted to fetch the payload data from the second portion of system memory on behalf of the network interface by performing direct virtual memory addressing of the system memory on behalf of the network processor based on a virtual memory address associated with the payload data and the page table data structure.

In the aforementioned embodiment, the payload data may be Transmission Control Protocol (TCP) payload data and the one or more network packets may be one or more TCP packets.

In various instances of the aforementioned embodiments, the interface may further be operable to retrieve a buffer descriptor from system memory. The buffer descriptor may contain (i) the virtual memory address and (ii) a virtual memory base address of a page directory of the page table data structure. In such instances, performing direct virtual memory addressing of the system memory may involve using a directory entry of the page directory identified by the virtual memory address to translate the virtual memory address to a physical address within the second portion of the system memory.

Other embodiments of the present invention provide a method of performing segmentation offloading involving a step for fetching payload data originated by a user process running on a host processor by performing direct virtual memory addressing of a user memory space of a system memory on behalf of a network processor and a step for the network processor segmenting the payload data across one or more packets.

In the aforementioned embodiment, segmenting the payload data across one or more packets may involve creating one or more Transmission Control Protocol (TCP) packets by performing TCP segmentation.

Other embodiments of the present invention provide a program storage device readable by one or more processors of a network device, tangibly embodying a program of instructions executable by the one or more processors to perform method steps for performing Transmission Control Protocol (TCP) segmentation offloading. Responsive to TCP payload data being stored to user memory space of a system memory, information indicative of a virtual memory address of the TCP payload data is received. The TCP payload data is then fetched from the user memory space by performing direct virtual memory addressing of the system memory based on the virtual memory address and a page table stored in the system memory. Finally, the TCP payload data is segmented across one or more TCP packets.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
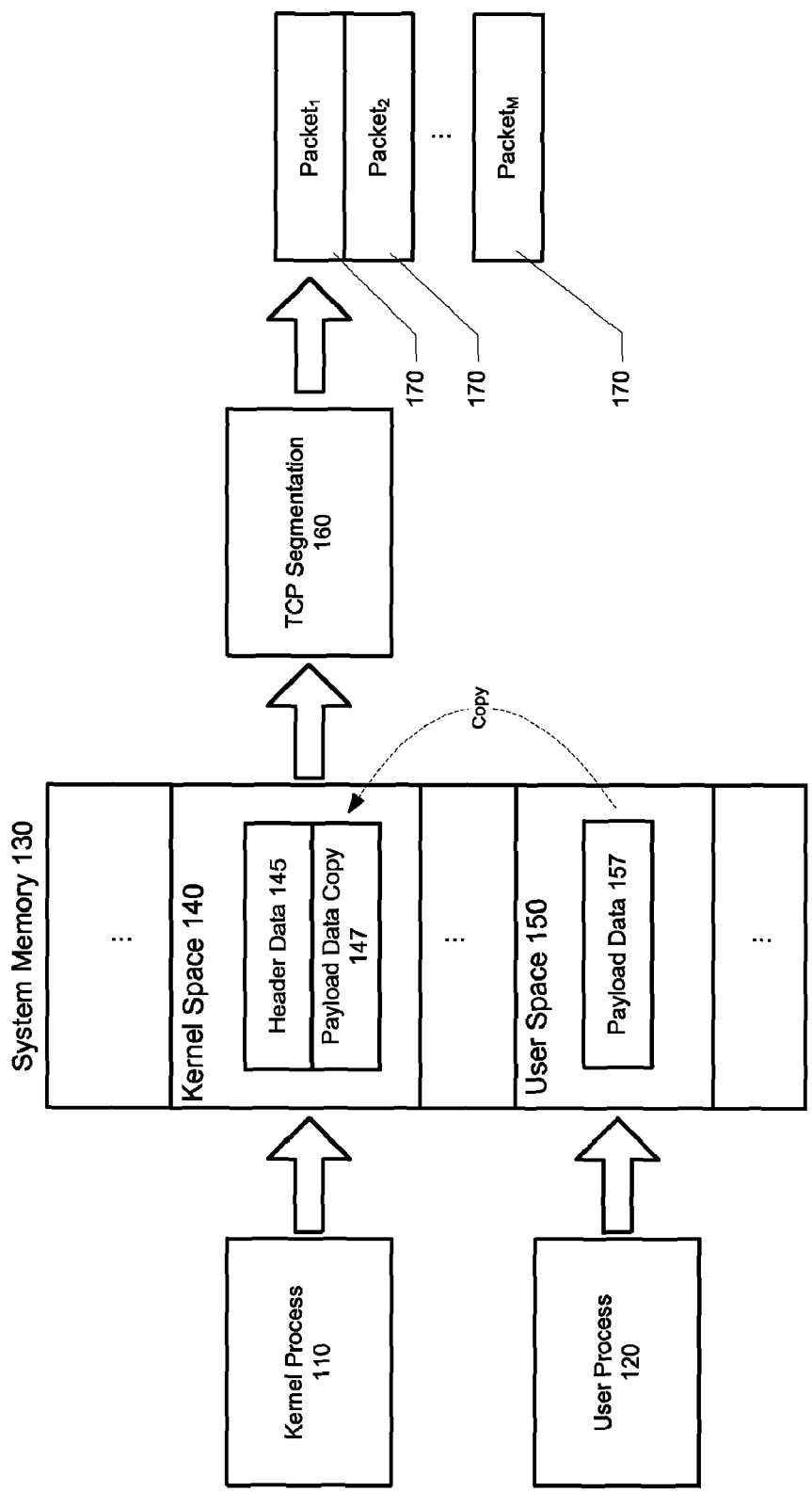
FIG. 1 conceptually illustrates TSO processing as it is traditionally performed.

Methods and systems are described for a more efficient transmission of network traffic. According to one embodiment, TSO processing does not require copying of payload data from user space to kernel space as a result of allowing virtual memory to be directly addressed by or on behalf of a network interface. Additionally, in one embodiment, scatter-gather functionality is provided, which allows data stored in non-continuous user space and/or kernel space and from which one or more TCP packets are to be formed to be fetched and concatenated together. In various embodiments, buffer descriptors used by the scatter-gather functionality can point to either physical memory or virtual memory.

For purposes of simplicity, various embodiments of the present invention are described in the context of a TCP traffic segmentation. It is to be noted, however, that the TSO processing described herein, for example, may be implemented generically enough so as to be used for offloading fragmentation of other transport layer protocols, or by doing Internet Protocol (IP) fragmentation for protocols that don't support fragmentation themselves, such as Universal Datagram Protocol (UDP). Thus, embodiments of the present invention provide techniques that may generally increase outbound throughput of high-bandwidth network connections by reducing CPU overhead.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Terminology

Brief definitions of terms used throughout this application are given below.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

Figure 2:
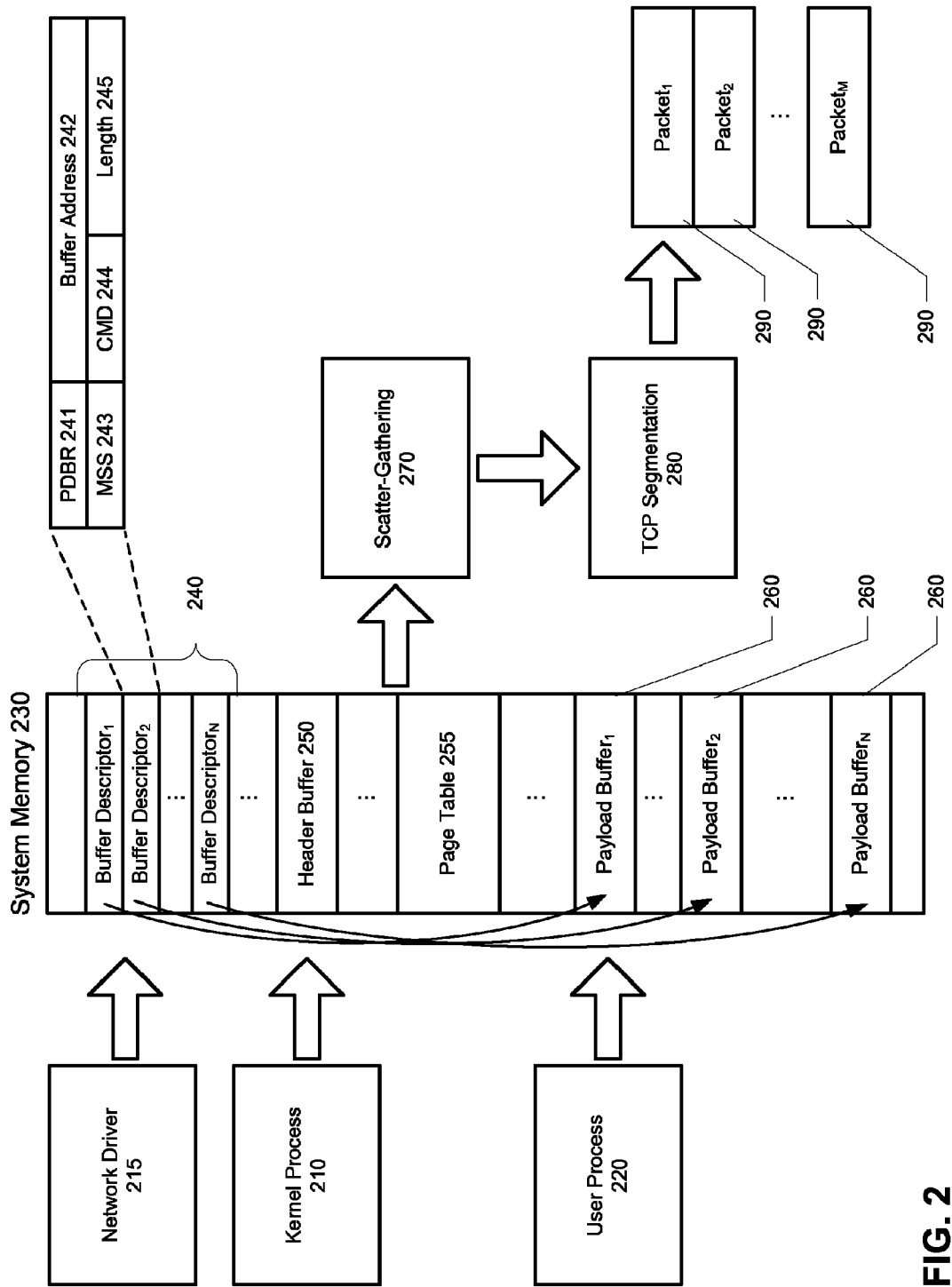
FIG. 2 conceptually illustrates TSO processing in accordance with various embodiments of the present invention.

FIG. 2 conceptually illustrates TSO processing in accordance with various embodiments of the present invention. It is to be understood that the present example is being described at an abstract level in connection with a logical view of various functional units, including, hardware and software components. Thus, FIG. 2 does not necessarily represent an actual physical view of the hardware and/or software components depicted or their interconnections.

In contrast to the TSO processing illustrated by FIG. 1, in the present example, TCP payload data need not be copied from user memory space to kernel memory space and need not be stored in contiguous memory. For purposes of the present example, it is assumed (as is typically the case) that the TCP payload is being originated by one or more user processes, such as user process 220.

According to the present example, a network driver 215, a kernel process 210 and/or a user process 220 may affect the content of a system memory 230 by storing data intended for Media Access Control (MAC) transmission or information to facilitate such transmission. System memory 230 is shown containing multiple buffer descriptors 240, a header buffer 250, a page table 255 and multiple payload buffers (i.e., payload buffer$_1$ to payload buffer$_N$).

The page table 255 is a translation data structure, which will be described further below, that allows interface hardware coupled to the system memory to directly address virtual memory to facilitate efficient TSO processing. According to one embodiment, the page table translation data structure mimics the 32-bit Intel Architecture (IA32) page table. In such an embodiment and in the context of an IA32 system, the network driver 215 can re-use the system's native page table structure. In the context of other systems, the network driver 215 may construct the desired page table structure from the native page table.

The buffer descriptors 240 are used to point to corresponding payload buffers containing TCP payload data. In the present example, a user process 220 may originate TCP payload data to be transmitted across a network (not shown). The user process 220 will typically rely on the network driver 215 to store the TCP payload data to system memory 230. In one embodiment, network driver 215 can use multiple buffer descriptors 240 (e.g., buffer descriptor$_1$ to buffer descriptor$_N$) to specify several payload buffers 260 (e.g., payload buffer$_1$ to payload buffer$_N$), which may be stored in physically noncontiguous memory and across which the user process originated TCP payload data may be distributed. Alternatively, a single buffer descriptor may be used to refer to a single payload buffer storing the TCP payload data or the multiple buffer descriptors may be limited to being associated with multiple payload buffers stored in physically contiguous memory. Notably, in embodiments in which multiple payload buffers may be stored in physically noncontiguous memory, a scatter-gathering capability described further below may be provided to allow efficient retrieval of the noncontiguous payload buffers from user memory space.

A kernel process 210 may create an appropriate TCP template header (not shown) and store the TCP template header within a header buffer 250 in kernel memory space for later use in connection with forming packets 290.

In one embodiment, each of the buffer descriptors 240 includes a PDBR field 241, a buffer address field 242, an MSS field 243, a CMD field 244 and a length field 245. Buffer descriptors 240 may be created by network driver 215 to point to a piece of memory (buffer) starting at an address specified by the buffer address 242 and having a number of bytes specified by the length field 245. The MMS field 243 specifies a maximum segment size (MSS) used by a TCP segmentation process 280 to appropriately segment the TCP payload data into an appropriate number of packets 290. The network driver 215 can use multiple buffer descriptors to specify several buffers for one packet and scatter-gathering hardware 270 can then fetch and concatenate them together to form a single packet for MAC transmission.

Each of the buffer descriptors 240 can point to either physical memory or virtual memory. In one embodiment, a virtual memory bit is provided within the CMD field 244 to indicate whether the address contained within the buffer address field 242 is a virtual or a physical address. As will be described further below, when the address contained within the buffer address field 242 is a virtual address, the PDBR field 241 contains the address of the base of a page directory in the page table 255 that will be used to translate the virtual address to a physical address thereby allowing direct virtual memory addressing of user memory space to retrieve payload data from a corresponding payload buffer.

In one embodiment, the functionality of one or more of the above-referenced functional units may be merged in various combinations. For example, the scatter-gathering module 270 and the TCP segmentation module 280 may be combined. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

According to embodiments of the invention, the functional units can be any suitable type of logic (e.g., digital logic, software code and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes, but is not limited to, read only memory (ROM), random access memory (RAM), magnetic disk storage media, optical storage media or flash memory devices.

According to one embodiment and as described further below, the scatter-gathering functionality is performed on behalf of a network interface of a network device by a bus/memory interface coupled to the system bus and the TCP segmentation processing is performed by the network interface.

Returning to the role of the user process 220 briefly, it is worth noting that in various embodiments locking and/or signaling techniques can be used to communicate to user space processes when the payload buffers 260 are available to be reused and/or the associated memory can be freed. In one embodiment, once a corresponding buffer descriptor is created by the network driver 215 for a particular payload buffer, the network driver 215 can mark the pages as read-only to user space applications. In this manner, if the application 220 writes to the buffers again, an exception would be raised and the kernel would be able to make a writable copy available to the user application 220. In alternative embodiments, the user space process 220 can be made aware of the need to wait until the payload data from the payload buffer has sent before attempting to write to payload buffer again. For example, in the context of a Linux vmsplice( ) call, the user process 220 should not write to the page again until the page is no longer shared. In other embodiments, synchronization may be performed at a higher level (e.g., a high-level protocol in which the other end acknowledges receipt of the payload data).

Figure 3:
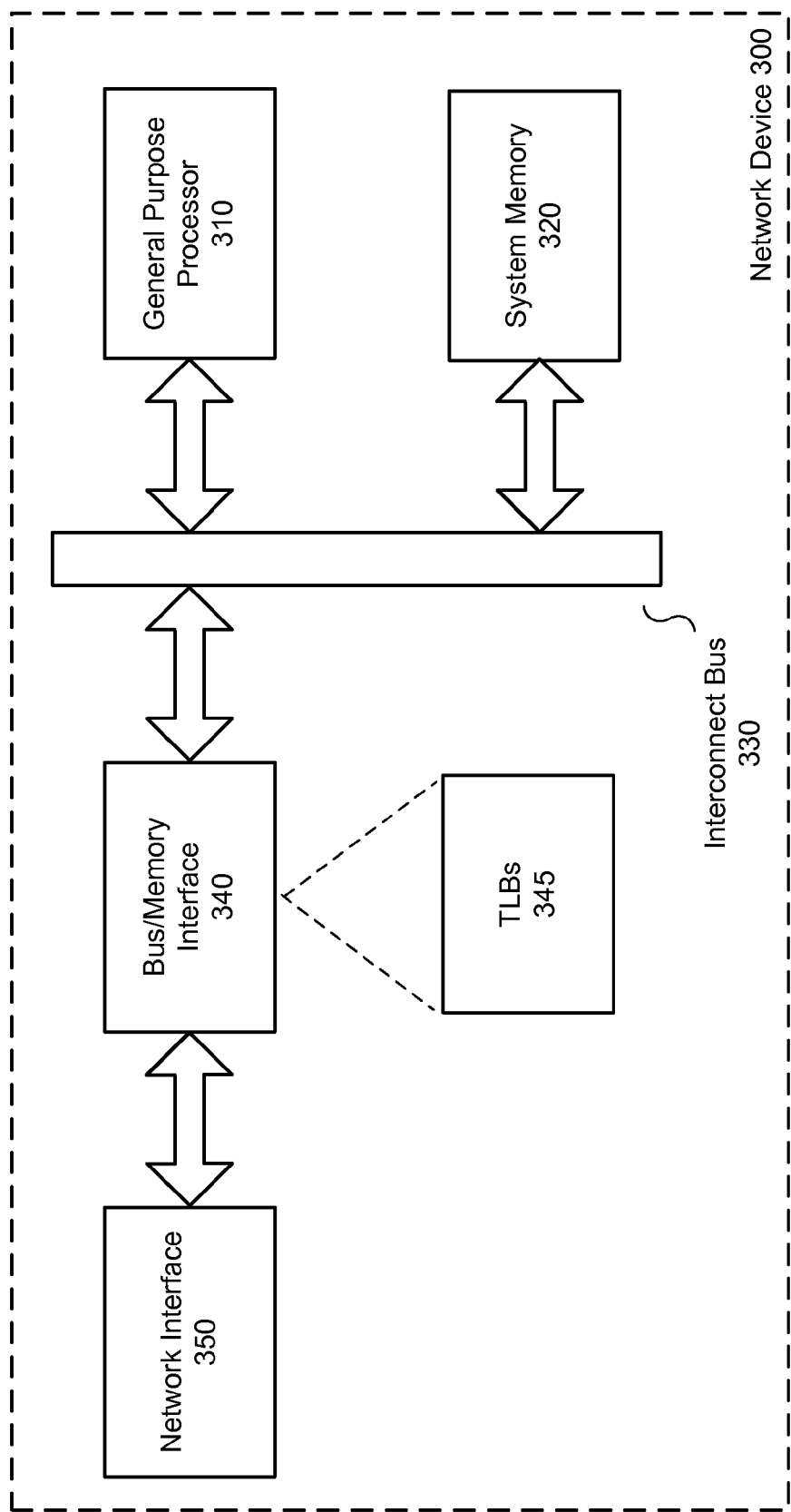
FIG. 3 is an example of a system in which embodiments of the present invention may be utilized.

FIG. 3 is an example of a network device 300 in which embodiments of the present invention may be utilized. In the present example, network device 300 includes a network interface 350, a bus/memory interface 340, an interconnect bus, a general purpose processor 310 and a system memory. General purpose processor 320 may be any processor that is tailored for executing software commands indicated by an operating system. Thus, for example, general purpose processor may be, but is not limited to the various processors currently found in personal computers such as those offered by Intel and AMD. Based on the disclosure provided herein, one of ordinary skill in the art will recognize a variety of general purpose processors that may be used in relation to different embodiments of the present invention. In one embodiment, processor 320 may be implemented as a semiconductor device such as, for example, a programmable gate array or an application specific integrated circuit.

Bus/memory interface 340 provides control for interconnect bus 330 and access to system memory 320. In particular embodiments of the present invention, interconnect bus 330 is a Peripheral Component Interconnect (PCI) bus, system memory 320 is a random access memory 330, and bus/memory interface 340 is a chipset currently available for controlling the PCI bus and providing access to system memory 330. It should be noted that interconnect bus 330 may be, but is not limited to, a PCI interface, a Peripheral Component Interconnect Extended (PCI-X) interface, a Peripheral Component Interconnect Express (PCIe) interface, or a HyperTransport (HT) interface.

As described with reference to FIG. 2, system memory 320 may have stored therein, among other things, one or more buffer descriptors (e.g., buffer descriptors 240), a TCP template header contained within a header buffer (e.g., header buffer 250), a page table, and one or more payload buffers (e.g., payload buffer$_1$ to payload buffer$_N$). The page table 255 is a translation data structure, which will be described further below, that allows interface hardware coupled to the system memory to directly address virtual memory to facilitate efficient TSO processing.

Depending upon the particular implementation, network interface 350 may be a network interface unit (NIU), such as a network interface card (NIC), or other network interface device to allow network device 300 to connect to an outside network. In one embodiment, network interface 350 includes a network processor or other digital logic (not shown) to allow it to perform TSO processing to offload the general purpose processor 310. In one embodiment, TSO processing may be performed by the network processor. Alternatively, TSO may be performed in hardware, and the kernel just does a memory address conversion on each vector of a scatter-gather table.

In one embodiment, bus/memory interface 340 is configured to perform the scatter-gathering processing and capable of performing direct virtual memory addressing of system memory 320 based on a page table translation data structure stored therein or based on the most recently used page-directory and page-table entries in on-chip caches called translation lookaside buffers or TLBs 345. In some embodiments of the present invention, the bus/memory interface 340 implements virtual addressing only for accesses to TCP payload data contained within payload buffers stored in user memory space via a PCI bus. In such cases, the bus/memory interface 340 only includes a TLB 345 for the system memory 320. As described below, such a TLB may include reference for both 4-KByte pages and 4-MByte pages. Most paging may be performed using the contents of the TLBs inside the same task. PCI bus cycles to the page directory and page tables in system memory 320 need only be performed when the TLBs 345 do not contain the translation information for a requested page. The TLBs 345 may be invalidated when a page-directory or page-table entry is changed between different tasks.

Figure 4A:
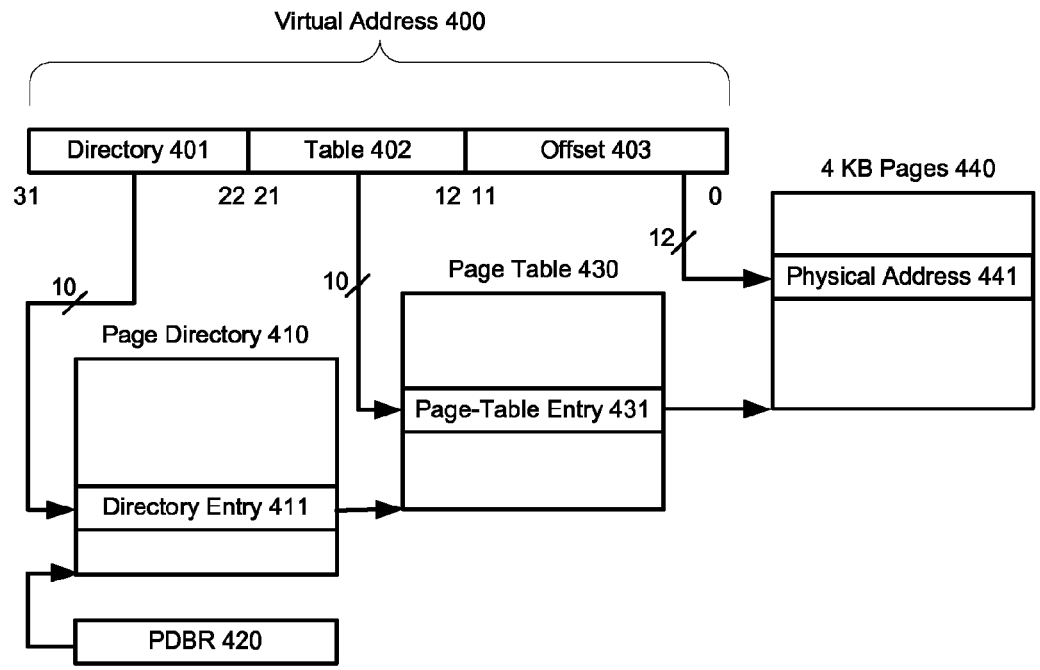
FIGS. 4A-4B depict exemplary virtual addressing mechanisms that may be used in relation to various embodiments of the present invention.
Figure 4B:
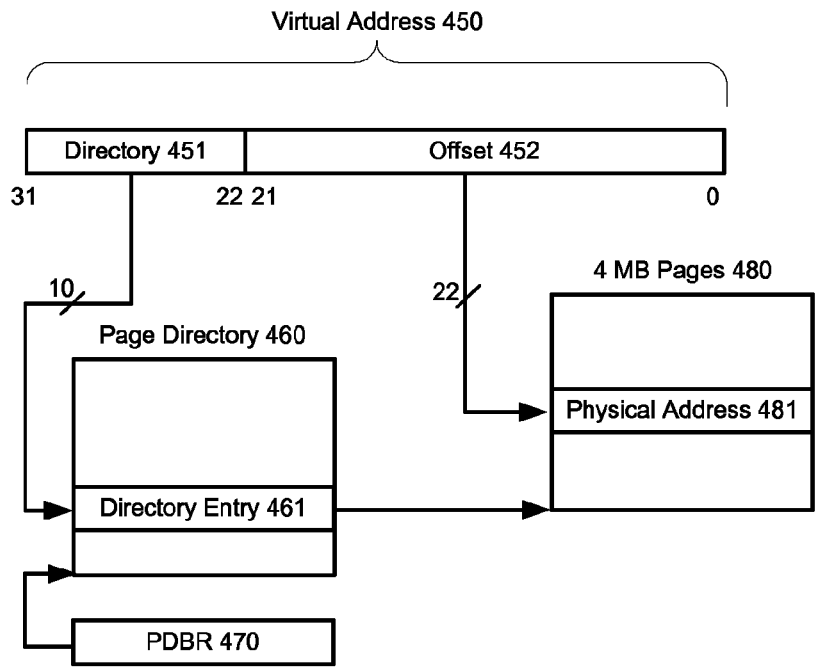

FIGS. 4A-4B depict exemplary virtual addressing mechanisms that may be used in relation to various embodiments of the present invention. In particular, FIG. 4A shows a hierarchy of a page directory 410 and a page table 430 utilized when mapping virtual addresses 400 to exemplary 4-KByte pages 440. The entries in page directory 410, such as directory entry 411, point to page table 430, and the entries in page table 430, such as page-table entry 431, point to pages 440 in physical memory specified by a particular physical address, such as physical address 441.

Based on (i) a base address of the page directory 410, which may be specified by a PDBR field 420 of a buffer descriptor as described above and (ii) a directory field 401, a table field 402 and an offset field 403 of the virtual address 400, the bus/memory interface 340 may perform direct virtual memory addressing of user memory space to retrieve payload data from a corresponding payload buffer on behalf of a network processor, for example, of the network interface 350.

A register (not shown) may be used to indicate when an associated general purpose processor has invalidated one or more entries of page directory 410. Where such invalidation occurs, it is up to the network interface 350 and/or the bus/memory interface 340 to refresh the page table by accessing system memory 320.

FIG. 4B shows a process for using a page directory 460 to map a virtual address 450 to exemplary 4-MByte pages 480. The entries in page directory 460, such as directory entry 461, point to 4-MByte pages 480 in physical memory.

Based on (i) a base address of the page directory 460, which may be specified by a PDBR field 470 of a buffer descriptor as described above and (ii) a directory field 451 and an offset field 452 of the virtual address 450, the bus/memory interface 340 may perform direct virtual memory addressing of user memory space to retrieve payload data from a corresponding payload buffer on behalf of a network processor, for example, of the network interface 350.

A register (not shown) may be used to indicate when an associated general purpose processor has invalidated one or more entries of page directory 460. Where such invalidation occurs, it is up to the network interface 350 and/or bus/memory interface 340 to refresh the page table by accessing system memory 320.

Figure 5:
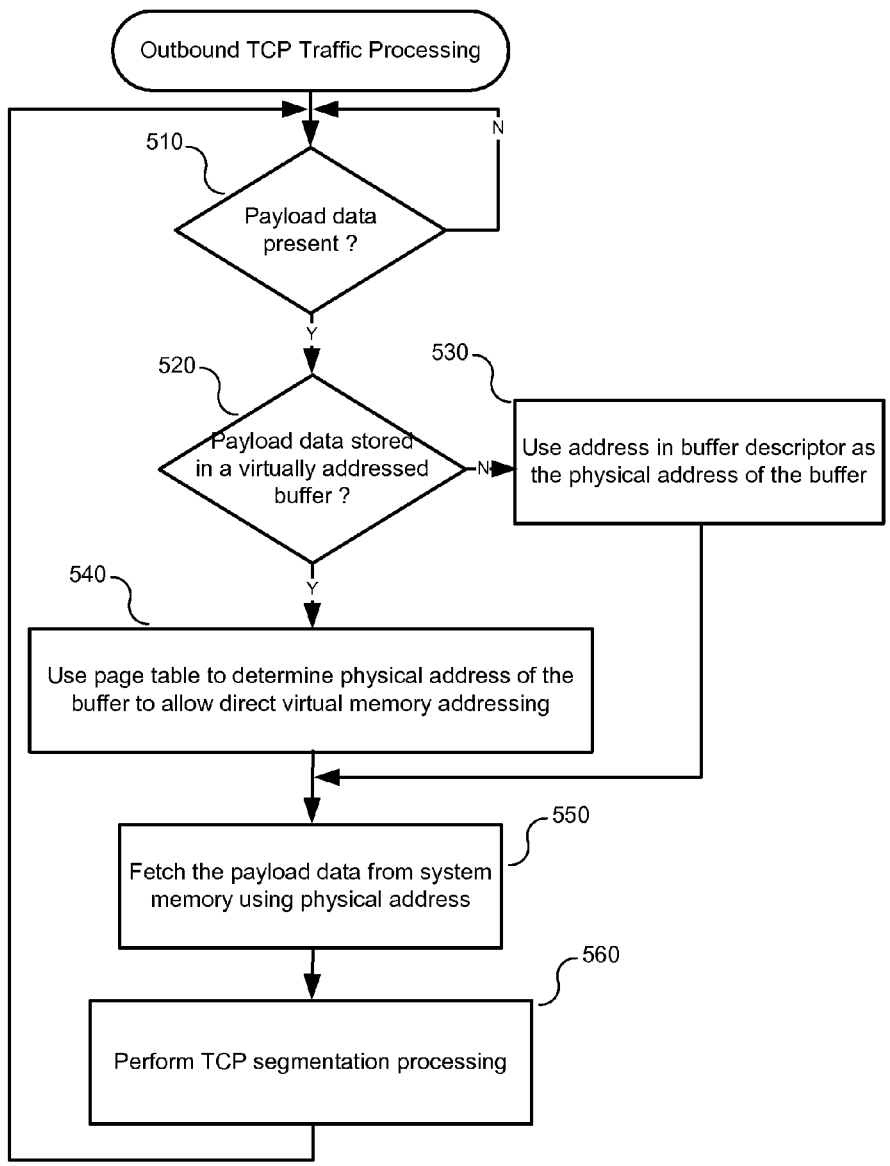
FIG. 5 is a flow diagram illustrating outbound TCP traffic processing in accordance with an embodiment of the present invention.

FIG. 5 is a flow diagram illustrating outbound TCP traffic processing in accordance with an embodiment of the present invention. Depending upon the particular implementation, the various process and decision blocks described herein may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

According to the present example, outbound TCP traffic processing begins at decision block 510, in which it is determined if payload data is present. If so, processing continues with decision block 520; otherwise processing branches back to decision block 510 until payload data is present. In one embodiment of the present invention, a network interface (e.g., network interface 350) or bus/memory interface (e.g., bus/memory interface 340) is interrupted on a periodic basis to trigger a check for an indication of available outbound payload data to be processed. Alternatively, the interrupts may be event driven and be received whenever a network driver (e.g., network driver 215) stores a buffer descriptor to system memory (e.g., system memory 230). Furthermore, interrupts may be received upon a payload buffer being stored to system memory. Such interrupts may be received using any interrupt scheme known in the art including, but not limited to, using a polling scheme where bus/memory interface or network interface periodically review an interrupt register, or using an asynchronous interrupt port of a network processor associated with the network interface. Alternatively or additionally, network interface or bus/memory interface may proactively on an as needed basis when network interface has the processing and memory resources to allow it to transmit additional data over a network to which it is coupled. Based on the disclosure provided herein, one of ordinary skill in the art will recognize a variety of interrupt and/or polling mechanisms that may be used in relation to different embodiments of the present invention.

If payload data has been determined to be present, at decision block 520, it is further determined whether the payload data is stored in a virtually addressed buffer (e.g., stored in user space) or a physically addressed buffer (e.g., stored in kernel space). If the payload data is stored in a virtually addressed buffer, then processing continues with block 540; otherwise processing branches to block 530. According to one embodiment, the determination regarding whether the payload data is stored in a virtually addressed buffer is made with reference to a buffer descriptor associated with the payload data. For example, as described above each payload buffer may have a corresponding buffer descriptor containing information regarding one or more of an address specifying the starting address of the payload data in system memory, a length (e.g., in bytes) of the payload data, a maximum segment size applicable to the payload data, a virtual memory indicator specifying whether the aforementioned address is a virtual or a physical address and other information useful for locating, retrieving and otherwise processing the payload data. In other embodiments, this determination may not be required as a convention could be established that all payload data shall be stored in virtual memory.

At block 530, it has been determined that the payload data is stored in a physically addressed buffer. Therefore, the address of the payload data (specified within the corresponding buffer descriptor, for example) is recognized and used as a physical address.

At block 540, it has been determined that the payload data is stored in a virtually addressed buffer. Therefore, the address of the payload data (specified within the corresponding buffer descriptor, for example) is translated to a physical address using a virtual addressing mechanism (e.g., a page table translation data structure, such as page table 255 or one of those depicted in FIG. 4A or 4B). According to one embodiment, information is used from various portions of the address to perform page table walking to extract a physical address from a page table translation data structure.

At block 550, the payload data is fetched from system memory using the physical address determined in block 540 or the original buffer address determined to be a physical address in decision block 520. According to one embodiment, a bus/memory interface performs both the direct virtual memory addressing and the fetching from system memory on behalf of a network interface. In one embodiment, the fetching concludes a scatter-gather process in which various portions of payload data have been stored in noncontiguous memory as part of multiple payload buffers and are pieced back together by retrieving the multiple payload buffers. In the most likely usage scenario, a packet consists of a physically addressed buffer pointing to the (MAC+IP+TCP) header constructed by the kernel, followed by one or more virtually addressed buffers pointing to the TCP payload originated by a user mode application. Advantageously, with the direct virtual memory addressing capability described herein, no user to kernel memory coping is needed thereby further increasing resource utilization of the general purpose processor of the network device in the context of network traffic segmentation processing.

At block 560, TCP segmentation is performed. In one embodiment, after fetching all the buffer data from both physically and virtually addressed buffers (header and payload data, respectively), TCP segmentation offloading, which segments the payload into multiple packets to satisfy the maximum segment size, is performed. For example, one or more packets (e.g., packets 290) are formed by dividing up the payload data gathered in block 550 among an appropriate number of packets based on the maximum segment size. According to one embodiment, the segmentation is performed by a network processor separate and independent from the general purpose processor that originated the payload data in an effort to increase system throughput and decrease usage of the general purpose processor. Checksum offloading (CSO), which calculates the correct IP and TCP checksum for each segment can also be performed. Advantageously, in accordance with embodiments of the present invention, both TSO and CSO can be performed without intervention from the general purpose processor of the network device.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method of performing segmentation offloading, the method comprising:
    storing a buffer descriptor in a system memory, the buffer descriptor containing (i) information indicative of a starting address of a packet buffer in a user memory space of the system memory, the packet buffer containing payload data originated by a user process running on a host processor and (ii) information indicative of whether the starting address is virtual or physical; and
    an interface performing direct virtual memory addressing of the user memory space on behalf of a network processor to fetch the payload data; and
    the network processor segmenting the payload data across one or more packets, wherein said segmenting the payload data across one or more packets comprises creating one or more Transmission Control Protocol (TCP) packets by performing TCP segmentation.

2. The method of claim 1, further comprising, storing a plurality of buffer descriptors in system memory, including
 a first buffer descriptor of the plurality of buffer descriptors containing (i) information indicative of a first starting address of a first packet buffer in system memory containing a first portion of the payload data and (ii) information indicative of whether the first starting address is virtual or physical; and
 a second buffer descriptor of the plurality of buffer descriptors containing (i) information indicative of a second starting address of a second packet buffer in system memory containing a second portion of the payload data and (ii) information indicative of whether the second starting address is virtual or physical.

3. The method of claim 1, wherein the buffer descriptor further contains information indicative of a base address of a virtual memory page directory and wherein said performing direct virtual memory addressing of a user memory space further comprises using a directory entry of the virtual memory page directory identified by the starting address to translate the starting address to a physical address within the user memory associated with the packet buffer.

4. A network device comprising:
 a processor configured to execute one or more kernel processes and one or more user processes;
 a system memory, coupled to the processor, having stored therein a page table data structure containing information for use in connection with translating virtual addresses to physical addresses, the system memory having a first portion of memory designated for use by the one or more kernel processes and a second portion of memory designated for use by the one or more user processes;
 a network interface operable to segment payload data across one or more network packets and to transmit the one or more network packets to a destination via a network;
 an interconnect bus coupled to the processor and the system memory;
 an interface, coupled to the network interface and the interconnect bus, adapted to fetch the payload data from the second portion of memory on behalf of the network interface by performing direct virtual memory addressing of the system memory on behalf of the network processor based on a virtual memory address associated with the payload data and the page table data structure; and
 wherein the interface is further operable to retrieve a buffer descriptor from the system memory, the buffer descriptor containing (i) the virtual memory address and (ii) a base address of a virtual memory page directory of the page table data structure and wherein said performing direct virtual memory addressing of the system memory comprises using a directory entry of the virtual memory page directory identified by the virtual memory address to translate the virtual memory address to a physical address within the second portion of memory.

5. The network device of claim 4, wherein the payload data comprises Transmission Control Protocol (TCP) payload data and the one or more network packets comprise one or more TCP packets.

6. A method of performing segmentation offloading, the method comprising:
 a step for storing a buffer descriptor in a system memory, the buffer descriptor containing (i) information indicative of a starting address of a packet buffer in a user memory space of the system memory, the packet buffer containing payload data originated by a user process running on a host processor and (ii) information indicative of whether the starting address is virtual or physical; and
 a step for fetching the payload data by performing direct virtual memory addressing of the user memory space on behalf of a network processor; and
 a step for the network processor segmenting the payload data across one or more packets to create one or more Transmission Control Protocol (TCP) packets by performing TCP segmentation.

7. The method of claim 6, further comprising, storing a plurality of buffer descriptors in system memory, including
 a first buffer descriptor of the plurality of buffer descriptors containing (i) information indicative of a first starting address of a first packet buffer in system memory containing a first portion of the payload data and (ii) information indicative of whether the first starting address is virtual or physical; and
 a second buffer descriptor of the plurality of buffer descriptors containing (i) information indicative of a second starting address of a second packet buffer in system memory containing a second portion of the payload data and (ii) information indicative of whether the second starting address is virtual or physical.

8. The method of claim 6, wherein the buffer descriptor further contains information indicative of a base address of a virtual memory page directory and wherein said performing direct virtual memory addressing of a user memory space further comprises using a directory entry of the virtual memory page directory identified by the starting address to translate the starting address to a physical address within the user memory associated with the packet buffer.

9. A non-transitory program storage device readable by one or more processors of a network device, tangibly embodying a program of instructions executable by the one or more processors to perform method steps for performing Transmission Control Protocol (TCP) segmentation offloading, the method comprising:
 storing a buffer descriptor in a system memory, the buffer descriptor containing (i) information indicative of a starting address of a packet buffer in a user memory space of the system memory, the packet buffer containing payload data originated by a user process running on a host processor and (ii) information indicative of whether the starting address is virtual or physical; and
 an interface performing direct virtual memory addressing of the user memory space on behalf of a network processor to fetch the payload data; and
 the network processor creating one or more Transmission Control Protocol (TCP) packets by segmenting the payload data across the one or more TCP packets.

10. The non-transitory program storage device of claim 9, wherein the method further comprises, storing a plurality of buffer descriptors in system memory, including
 a first buffer descriptor of the plurality of buffer descriptors containing (i) information indicative of a first starting address of a first packet buffer in system memory containing a first portion of the payload data and (ii) information indicative of whether the first starting address is virtual or physical; and
 a second buffer descriptor of the plurality of buffer descriptors containing (i) information indicative of a second starting address of a second packet buffer in system memory containing a second portion of the payload data and (ii) information indicative of whether the second starting address is virtual or physical.

11. The non-transitory program storage device of claim 9, wherein the buffer descriptor further contains information indicative of a base address of a virtual memory page directory and wherein said performing direct virtual memory addressing of a user memory space further comprises using a directory entry of the virtual memory page directory identified by the starting address to translate the starting address to a physical address within the user memory associated with the packet buffer.

* * * * *